Figure 1:
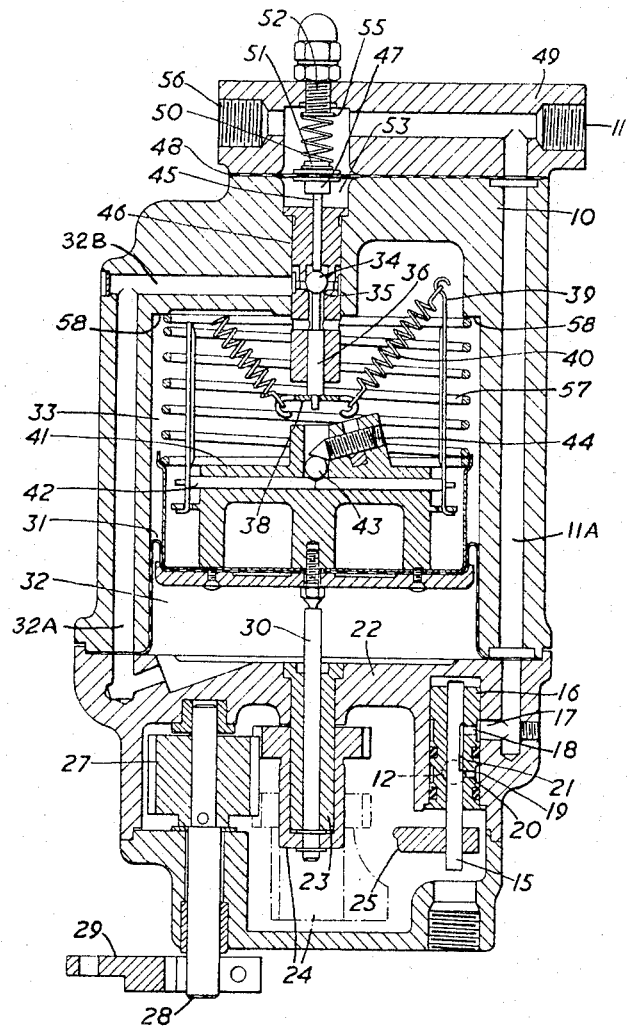

Nov. 8, 1966  H. E. JACKSON  3,283,771

FLUID METERING DEVICES

Filed Dec. 16, 1963  2 Sheets-Sheet 1

INVENTOR
H. E. Jackson
BY
ATTORNEY.

Nov. 8, 1966   H. E. JACKSON   3,283,771
FLUID METERING DEVICES

Filed Dec. 16, 1963   2 Sheets-Sheet 2

INVENTOR
H. E. Jackson
BY
ATTORNEY

United States Patent Office 3,283,771
Patented Nov. 8, 1966

3,283,771
FLUID METERING DEVICES
Harold E. Jackson, Plympton St. Mary, Devon England, assignor to Petrol Injection Limited, Devon, England, a British company
Filed Dec. 16, 1963, Ser. No. 330,965
Claims priority, application Great Britain, Dec. 21, 1962, 48,480/62
7 Claims. (Cl. 137—85)

This invention relates to metering devices and is particularly related to devices for metering fluid flow in dependence upon two or more control variables.

Such a metering device may be used in a fuel injection system for an internal combustion engine in order to control the fuel flow to the injector devices in dependence with engine throttle opening and fuel pressure.

According to the present invention, a metering device having inlet and outlet ports for fluid to be metered includes a cam movable in two senses in response to respective control variables, and a cam follower responsive to movement of the cam in either sense to operate a metering valve member for controlling the flow of fluid from the inlet port to the outlet port.

A device in accordance with the invention for metering fluid flow from an inlet port to an outlet port may include a cam having a three dimensional cam-surface mounted for both rotary and linear movement, devices coupled to the cam for respectively rotating and linearly moving of the cam and a cam follower responsive both to rotary and linear movement of the cam to operate a metering valve member to control fluid flow from the inlet port to the outlet port.

Conveniently, the metering valve member may be operable to vary the area of the inlet port in communication with the outlet port.

The cam may be formed with a peripheral gear, by means of which the cam can be rotated, and which may mesh with a pinion rotatable by operation of a control linkage. The cam also may carry a control shaft, axial movement of which moves the cam along the pinion. The control shaft may be secured to a resilient diaphragm in such manner that the shaft is moved in response to movements of the diaphragm.

A particular embodiment includes a cam having a three dimensional cam surface and mounted for rotation and for linear movement in response to flexure of a first diaphragm. The cam has a shaft connected to a second resilient diaphragm and flexure of the further diaphragm causes movement of the shaft and linear movement of the cam. One side of the second resilient diaphragm is exposed to a convenient source of fluid pressure and can communicate with a vented compartment via an orifice through which flow is controlled by an obturating member. The obturating member is coupled to the second diaphragm by a resilient linkage and is directly coupled to the first resilient diaphragm. The first diaphragm is so disposed that either or both sides may be exposed to a source of control pressure, either liquid or gaseous. Movement of the first diaphragm, in response to either or both sources of control pressure, moves the obturating member, which movement is transmitted by the resilient linkage to the second diaphragm and hence to the cam to cause linear movement thereof and alteration of the position of the control valve. Movement of the obturating member by the first diaphragm disturbs the equilibrium condition which previously existed across the second diaphragm and a new equilibrium position is adopted by the obturating member and the second diaphragm. The interconnection between the cam and the first diaphragm constitutes a fluid operable servomechanism that serves to translate relatively small movements of the first diaphragm into corresponding larger linear movements of the cam.

Figure 2:
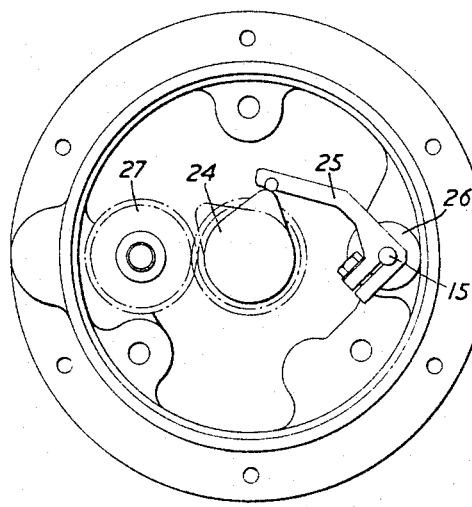
Figure 3:
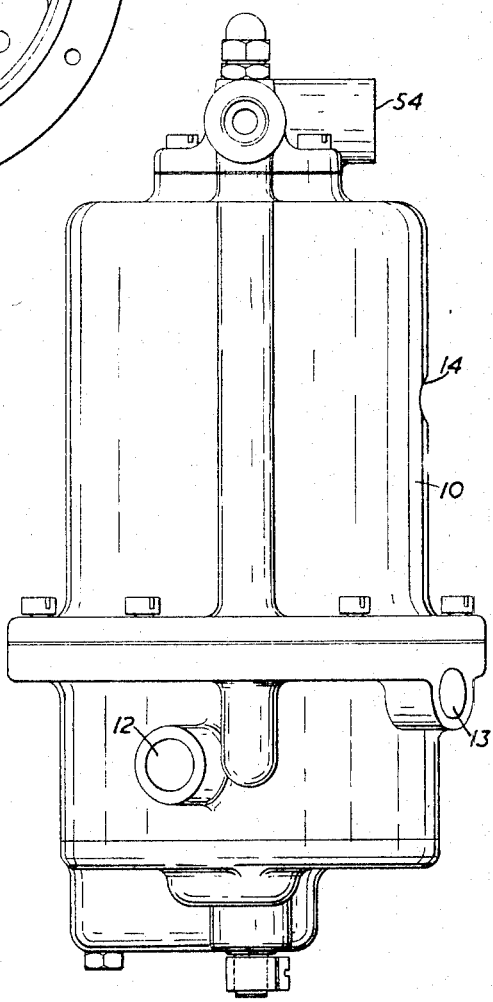

By way of example, an embodiment of the invention will be described in greater detail with reference to the accompanying drawings, in which:

FIG. 1 is an axial section through a metering device,
FIG. 2 is an end view of FIG. 1 with the lower end cap removed, and
FIG. 3 is a side view of FIG. 1.

The metering device has a casing 10 formed with a fluid inlet 11 and fluid outlet 12, a fluid inlet 13 and an escape vent 14. The inlet 11 is able to communicate via a passage 11A with the outlet 12 under control of a valve having a stem 15 rotatable in a sleeve 16 which is located in a passage connecting the inlet passage 11A and outlet 12. The sleeve 16 has an external peripheral recess 17 which communicates with the inlet passage 11A, and is connected to the bore of the sleeve by a passage 18. A further external peripheral recess 19 in the sleeve 16 registers with the outlet 12 and is connected to the bore of the sleeve by a passage 20. The valve stem 15 is a close fit in the bore of the sleeve 16 and has a flat 21 formed over part of its length and which can register with both passages 18 and 20. The flat 21 is so dimensioned that rotation of the stem 15 accurately determines the area of the passage 18, and hence the amount of fluid flowing therethrough, in communication with the passage 20 and the outlet 12.

The casing 10 has a centrally apertured internal web 22 and a boss 23 seats in the aperture. Mounted for rotation around, and axial movement along, the boss is a cam member 24 having a gear formed at its upper end. A lever 25, constituting a cam-follower secured to the valve stem 15, is urged against the cam member 24 by a coil spring 26. The cam member 24 is pear-shaped in cross-section as seen in FIG. 2 and thus rotation of the cam member will cause the lever 25 to rotate the valve stem 15.

A pinion 27 meshes with the gear of the cam 24 and can co-operate with the gear over the whole length of linear travel of the cam 24. The pinion 27 is supported by a shaft 28 rotatable by a lever 29 connected, in use of the metering device, to suitable control means. Thus, movement of the control means will cause rotation of the cam 24 and hence of the valve stem 15 and control the volume of fluid passing from the fluid inlet 11 to the fluid outlet 12.

The cam 24 is contoured around its periphery, as shown in FIG. 2, and also is contoured in an axial direction, as shown in FIG. 1. In FIG. 1, the full line section of the cam 24 shows it in one extreme position with respect to its rotary and axial movements whilst the broken-line outline shows the cam in its other extreme position of both rotary and axial movements and indicates the axial profiling of the cam. The cam 24 thus has a pear-shaped cross-section increasing in area from the top to the bottom of the cam as seen in FIG. 1. It will be appreciated that the actual profiles adopted for the peripheral and axially extending cam surfaces will depend upon the requirements of a particular design.

The cam 24 is carried by a shaft 30 secured at its lower end to the bottom of the cam and at its upper end to a diaphragm 31 clamped around its periphery together with an O-ring seal between upper and lower portions of the casing 10 above the fluid inlet 13 and the web 22, defining a chamber 32. This chamber can communicate, via drillings 32A and 32B in the walls of the upper portion of the casing 10, with a chamber 33 in the interior of the upper portion of the casing 10 above the diaphragm 31, and hence with the escape aperture 14, under control of a ball-valve 34 which can co-operate with an orifice 35 to determine the leakage rate from the chamber 32 via the aperture 14.

The ball-valve 34 is carried by a pin 36 which extends through the orifice 35 into the chamber 33 and is spigoted at its lower extremity in a platform 38. Pivoted between the respective ends of the platform 38 and the respective upper ends of links 39 are coil springs 40, the lower ends of the links 39 being pivoted to a platform 41 secured to the upper surface of the diaphragm 31. The links 39 are urged outwardly by rods 42 arranged radially in the platform 41. A ball 43 engages the inner faces of rods 42 and a screw 44 has a conical end which engages the ball 43; movement of the screw 44 inwards causes axial movement of the ball 43 which in turn drives the rods 42 outwards to alter the tension on the springs 40. A helical coil spring 57 is located between the platform 41 and shoulders 54 which extend inwardly of the chamber 33.

The ball-valve 34 also bears upon one end of a shaft 45 slidably extending through a closely fitting sleeve 46 in the top, as seen in FIG. 1, of the casing 10, and the other end of the shaft 45 carries a cap 47 which bears upon a diaphragm 48 secured by a block 49 to the casing in sealed relationship therewith. A spring 50 bears through a cap 51 on the diaphragm 48 and the spring loading is adjustable by a screw 52.

A chamber 53 formed below the diaphragm 48 communicates with a port 54 whilst the port 11 communicates with a chamber 55 formed above the diaphragm 48, and also with a port 56.

Thus, flexure of the diaphragms 31 and 48 causes linear movement of the shaft 30, and hence of the cam 24, and rotation of the lever 25 and the valve stem 15.

In use of the metering device illustrated, the inlet 13 is connected to a convenient source of gaseous fluid pressure, the inlet 11 to a source of fluid to be metered and the outlet 12 to a suitable receiver for the metered fluid. The port 56 can be blocked off or it can be used together with the port 11 to connect the metering device in a fluid flow conduit. The port 54 may be connected to a source of convenient control fluid.

Movement of the lever 29 causes rotation of the cam 24 by the pinion 27, which rotation is transmitted by the lever 25 to rotate the valve stem 15 and vary the area of the inlet passage 18 in communication with the outlet 12.

Fluid supplied to the inlet 13 will pass through the chamber 32 and the drillings in the casing through the orifice 35 under control of the ball-valve 34 and escape from chamber 33 through the aperture 14, the ball-valve 34 taking up a position in which the leakage is such that the force on the diaphragm 31 due to the pressure in the chamber 32 is balanced by the combined action of the tension springs 40, the compression spring 50, the pressure acting on the upper surface of the diaphragm 48 and the pressure acting on the lower surface of the diaphragm 48. Should the pressure of the source connected to the inlet port 11 subsequently increase, this pressure acting on the upper surface of the diaphragm 48 will flex the diaphragm tending to close the ball-valve 34 and so raise the pressure in the chamber 32. The diaphragm 31 will now flex upwards under this increased pressure until the springs 40 have been sufficiently extended to overcome this increase in pressure on the diaphragm 48. The net result is that a new equilibrium position of the platform 41 is established and the shaft 30 has been raised from its previously held position. The upwards movement of the shaft 30 causes corresponding upwards movement of the cam 24, and rotation of the lever 25 and valve stem 15 in a direction to increase the area of the inlet passage 18 uncovered by the flat 21 on the valve stem 15. If the fluid pressure on the upper surface of diaphragm 48 decreases then the converse of the above described movement occurs with the shaft 30 taking up an equilibrium position lower than its previous position causing downwards movement of the cam 24 and rotation of the valve stem 15 to decrease the area of the inlet passage 18 which is uncovered by the flat 21.

The interconnection between the diaphragms 48 and 31 constitutes a fluid operable servomechanism serving to translate flexural movements of the diaphragm 48 into corresponding magnified linear movements of the shaft 30 and cam 24.

Increases and decreases of pressure in the control source connected to the port 54 will cause rotation of the valve stem 15 in senses corresponding to decreases and increases, respectively, of the fluid meing metered and supplied to the inlet port 11.

Thus, in the embodiment described, the position adopted by the valve stem 15 will depend upon the rotary position of the cam 24, in response to rotation of the lever 29, the pressure of the fluid being metered and connected to the port 11 and the pressure of a control source connected to the port 54 which pressures act, through diaphragms 48 and 31 to vary the linear movement of the cam 24.

It will be appreciated that if the pressure of the fluid being metered is not required to be a control factor, then the upper side of the diaphragm 48 may be exposed to some other source of control pressure, either liquid or gaseous. Further, the sense of rotation of the valve stem 15 in response to control changes may be other than as described above.

What is claimed is:

1. A fluid metering device having a housing, first and second chambers in said housing, inlet and outlet ports defined in said housing, a metering valve member mounted for rotataion to control fluid flow from the inlet to the outlet port, a cam member mounted for both rotary and linear movements, said cam member having a three dimensional cam surface, a cam follower secured to said valve member and engaging said cam surface to rotate said valve member in response to rotary and/or linear movements of said cam member, a first resilient diaphragm extending across said first chamber, a first fluid inlet in said housing communicating with said first chamber on one side of said first diaphragm for exposure thereof to said first fluid pressure to flex said first diaphragm in response to changes in the first fluid pressure, a second resilient diaphragm dividing said second chamber into first and second regions, a second pressurised fluid inlet in said housing communicating with said first region and a vent aperture in said second region, means including an orifice interconnecting said first and second regions, a control valve member mounted for movement relative to said orifice to adjust the effective area thereof thereby to control the restriction provided by said orifice to fluid flow from said second pressurised fluid inlet to said vent aperture, means coupling said first diaphragm to said control valve member such that flexural movement of said first diaphragm causes movement of said control valve member to change the rate of fluid flow through said orifice, means directly coupling said second diaphragm to said cam member to move the latter linearly in response to flexure of said second diaphragm, a movement amplifying resilient linkage located in said second region of the second chamber operatively connecting said second diaphragm and said control valve, the arrangement being such that said control valve member is so positioned that in equilibrium the rate of said fluid flow through said orifice causes balanced forces to be exerted on either side of said second diaphragm, changes in position of said control valve member due to flexure of said first diaphragm altering the said rate of fluid flow through said orifice and the fluid pressure in said first region of said second chamber together with movement of said resilient linkage to cause magnified flexure of said second diaphragm and corresponding linear movement of said cam member and readjustment of the position of said control valve member to restore balanced force conditions across said second diaphragm, and means coupling said cam member to operating means for effecting rotary movement of said cam member.

2. A metering device according to claim 1, in which the metering valve member is mounted for rotation to vary the area of the inlet port in communication with the outlet port.

3. A metering device as claimed in claim 1, in which said movement amplifying resilient linkage includes first and second platforms disposed in the second region of said second chamber, means mounting said first platform on said second diaphragm and means coupling said second platform to said control valve member for movement therewith, a plurality of upstanding link members disposed around and pivoted to said first platform, spring members coupling said second platform with the other ends of said respective link arms such that movement of one of said platforms is transmitted via said spring members and link members to said other platform causing movement thereof.

4. A metering device as claimed in claim 1, and further including means intercommunicating said first control fluid inlet with said inlet port whereby flow of fluid between said inlet and outlet ports is controlled at least in part by pressure of that said fluid acting on said first diaphragm.

5. A fluid metering device having a housing, first and second chambers in said housing, inlet and outlet ports defined in said housing, a metering valve member mounted for rotation to control fluid flow from the inlet to the outlet port, a cam member mounted for both rotary and linear movements, said cam member having a three dimensional cam surface, a cam follower secured to said valve member and engaging said cam surface to rotate said valve member in response to rotary and/or linear movements of said cam member, a first resilient diaphragm extending across said first chamber, a first fluid inlet in said housing communicating with said first chamber one one side of said first diaphragm for exposure thereof to said first fluid pressure to flex said first diaphragm in response to changes in the first fluid pressure, a second resilient diaphragm dividing said second chamber into first and second regions, a second pressurised fluid inlet in said housing communicating with said first region and a vent aperture in said second region, means including an orifice interconnecting said first and second regions, a control valve member mounted for movement relative to said orifice to adjust the effective area thereof thereby to control the restriction provided by said orifice to fluid flow from said second pressurised fluid inlet to said vent aperture, means coupling said first diaphragm to said control valve member such that flexural movement of said first diaphragm causes movement of said control valve member to change the rate of fluid flow through said orifice, means directly coupling said second diaphragm to said cam member to move the latter linearly in response to flexure of said second diaphragm, a movement amplifying resilient linkage located in the second region of the second chamber, said linkage including a platform, means coupling said platform to said control valve member for movement therewith, a plurality of upstanding link members disposed around and each pivotally linked at one end to said second diaphragm, and respective spring members extending outwardly from said platform and coupling said platform with the other ends of said link members, said platform spring members and said link members in combination operate as a movement amplifying and transmission linkage between said control valve member and said second diaphragm, the arrangement being such that said control valve member is so positioned that in equilibrium the rate of said fluid flow through said orifice causes balanced forces to be exerted on either side of said second diaphragm, changes in position of said control valve member due to flexure of said first diaphragm altering the said rate of fluid flow through said orifice and the fluid pressure in said first region of said second chamber together with movement of said resilient linkage to cause magnified flexure of said second diaphragm and corresponding linear movement of said cam member and readjustment of the position of said control valve member to restore balanced force conditions across said second diaphragm, and means coupling said cam member to operating means for effecting rotary movement of said cam member.

6. A metering device according to claim 5, in which the metering valve member is mounted for rotation to vary the area of the inlet port in communication with the outlet port.

7. A metering device according to claim 6, and including a sleeve member mounted in said housing, said sleeve member having apertures in the walls thereof communicating with said inlet and outlet ports respectively, and in which said metering valve member comprises a valve stem closely rotatably fitted in the bore of said sleeve, said valve stem having a longitudinally extending flat surface extending over part of the length thereof such that rotation of the valve stem varies the area of the inlet port exposed by said flat surface and in communication with the outlet port.

References Cited by the Examiner
UNITED STATES PATENTS

| | | | |
|---|---|---|---|
| 2,613,906 | 10/1952 | Weimar | 251—208 |
| 2,728,231 | 12/1955 | Blair. | |
| 2,989,950 | 6/1961 | Lockman | 137—85 X |
| 3,039,988 | 6/1962 | Trinkler | 137—85 X |
| 3,131,863 | 5/1964 | Profos. | |

WILLIAM F. O'DEA, *Primary Examiner.*
ALAN COHAN, *Examiner.*